(12) United States Patent  
Conklin et al.

(10) Patent No.: US 8,505,042 B2  
(45) Date of Patent: Aug. 6, 2013

(54) METHODS AND APPARATUS FOR IDENTIFYING VIEWING INFORMATION ASSOCIATED WITH A DIGITAL MEDIA DEVICE

(75) Inventors: Charles C. Conklin, New Port Richey, FL (US); Christen V. Nielsen, Palm Harbor, FL (US); Joseph G. Milavsky, Dunedin, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 623 days.

(21) Appl. No.: 11/618,442

(22) Filed: Dec. 29, 2006

(65) Prior Publication Data

US 2007/0186229 A1     Aug. 9, 2007

Related U.S. Application Data

(63) Continuation of application No. PCT/US2005/023995, filed on Jul. 1, 2005.

(60) Provisional application No. 60/584,996, filed on Jul. 2, 2004.

(51) Int. Cl.  
    *H04H 60/32*          (2008.01)

(52) U.S. Cl.  
    USPC .................................. 725/14; 725/18; 725/20

(58) Field of Classification Search  
    USPC ...................................................... 725/9–21  
    See application file for complete search history.

(56) References Cited

U.S. PATENT DOCUMENTS

| | | |
|---|---|---|
| 4,361,832 A | 11/1982 | Cole et al. |
| 4,455,634 A | 6/1984 | Efron et al. |
| 4,566,030 A | 1/1986 | Nickerson et al. |
| 4,697,209 A | 9/1987 | Kiewit et al. |
| 4,792,864 A | 12/1988 | Watanabe et al. |
| 4,885,632 A | 12/1989 | Mabey et al. |
| 5,034,902 A | 7/1991 | Steinmann |
| 5,165,069 A | 11/1992 | Vitt et al. |
| 5,319,453 A | 6/1994 | Copriviza et al. |
| 5,373,315 A | 12/1994 | Dufresne et al. |

(Continued)

FOREIGN PATENT DOCUMENTS

| | | |
|---|---|---|
| EP | 1100265 A1 | 5/2001 |
| WO | WO9411989 | 5/1994 |

(Continued)

OTHER PUBLICATIONS

International Searching Authority, International Search Report and Written Opinion of International Searching Authority for PCT/US2005/023995, Dec. 23, 2005, 7 pages.

(Continued)

*Primary Examiner* — Pankaj Kumar  
*Assistant Examiner* — Randy Flynn  
(74) *Attorney, Agent, or Firm* — Hanley, Flight & Zimmerman, LLC

(57) ABSTRACT

Methods and apparatus for identifying viewing information associated with a digital media device are disclosed. In an example method, data conveyed via a data bus communicatively coupled to a processor and a data storage device associated with the digital media device is monitored. Event information associated with the digital media device is extracted from the data and the viewing information is identified based on the event information.

28 Claims, 7 Drawing Sheets

U.S. PATENT DOCUMENTS

| | | | |
|---|---|---|---|
| 5,425,100 A | 6/1995 | Thomas et al. | |
| 5,436,653 A | 7/1995 | Ellis et al. | |
| 5,438,355 A | 8/1995 | Palmer | |
| 5,481,294 A | 1/1996 | Thomas et al. | |
| 5,481,296 A | 1/1996 | Cragun et al. | |
| 5,483,276 A | 1/1996 | Brooks et al. | |
| 5,488,408 A * | 1/1996 | Maduzia et al. | 725/14 |
| 5,488,409 A | 1/1996 | Yuen et al. | |
| 5,532,732 A | 7/1996 | Yuen et al. | |
| 5,579,124 A | 11/1996 | Aijala et al. | |
| 5,646,675 A | 7/1997 | Copriviza et al. | |
| 5,734,720 A | 3/1998 | Salganicoff | |
| 5,844,478 A | 12/1998 | Blatter et al. | |
| 5,867,205 A | 2/1999 | Harrison | |
| 5,872,588 A | 2/1999 | Aras et al. | |
| 5,892,536 A | 4/1999 | Logan et al. | |
| 5,986,692 A | 11/1999 | Logan et al. | |
| 6,061,056 A | 5/2000 | Menard et al. | |
| 6,184,918 B1 | 2/2001 | Goldschmidt et al. | |
| 6,202,210 B1 | 3/2001 | Ludtke | |
| 6,216,265 B1 | 4/2001 | Roop et al. | |
| 6,233,389 B1 | 5/2001 | Barton et al. | |
| 6,253,238 B1 | 6/2001 | Lauder et al. | |
| 6,286,140 B1 | 9/2001 | Ivanyi | |
| 6,405,275 B1 | 6/2002 | Morrow et al. | |
| 6,457,010 B1 * | 9/2002 | Eldering et al. | 725/14 |
| 6,460,018 B1 | 10/2002 | Kasai et al. | |
| 6,513,161 B2 | 1/2003 | Wheeler et al. | |
| 6,529,506 B1 | 3/2003 | Yamamoto et al. | |
| 6,530,082 B1 | 3/2003 | Del Sesto et al. | |
| 6,567,978 B1 | 5/2003 | Jarrell | |
| 6,681,285 B1 * | 1/2004 | Ng | 348/718 |
| 6,704,929 B1 | 3/2004 | Ozer et al. | |
| 6,717,917 B1 * | 4/2004 | Weissberger et al. | 709/224 |
| 7,286,667 B1 * | 10/2007 | Ryal | 725/31 |
| 2001/0023436 A1 | 9/2001 | Srinivasan et al. | |
| 2002/0007416 A1 * | 1/2002 | Putzolu | 709/231 |
| 2002/0010919 A1 | 1/2002 | Lu et al. | |
| 2002/0010921 A1 * | 1/2002 | Kambayashi et al. | 725/32 |
| 2002/0056087 A1 | 5/2002 | Berezowski et al. | |
| 2002/0056089 A1 | 5/2002 | Houston | |
| 2002/0059576 A1 | 5/2002 | Feininger et al. | |
| 2002/0059577 A1 | 5/2002 | Lu et al. | |
| 2002/0059637 A1 | 5/2002 | Rakib | |
| 2002/0059643 A1 | 5/2002 | Kitamura et al. | |
| 2002/0069218 A1 | 6/2002 | Sull et al. | |
| 2002/0078441 A1 | 6/2002 | Drake et al. | |
| 2002/0124246 A1 | 9/2002 | Kaminsky et al. | |
| 2002/0141730 A1 | 10/2002 | Haken | |
| 2002/0162115 A1 | 10/2002 | Bruckner et al. | |
| 2002/0173911 A1 | 11/2002 | Brunet et al. | |
| 2002/0178277 A1 * | 11/2002 | Laksono | 709/231 |
| 2003/0005432 A1 | 1/2003 | Ellis et al. | |
| 2003/0037333 A1 * | 2/2003 | Ghashghai et al. | 725/9 |
| 2003/0039464 A1 | 2/2003 | Davis et al. | |
| 2003/0067554 A1 * | 4/2003 | Klarfeld et al. | 725/46 |
| 2003/0093790 A1 | 5/2003 | Logan et al. | |
| 2003/0115587 A1 | 6/2003 | Kendall et al. | |
| 2003/0170001 A1 | 9/2003 | Breen | |
| 2003/0172376 A1 | 9/2003 | Coffin, III | |
| 2003/0177488 A1 | 9/2003 | Smith et al. | |
| 2003/0182567 A1 | 9/2003 | Barton et al. | |
| 2003/0192060 A1 | 10/2003 | Levy | |
| 2004/0010807 A1 | 1/2004 | Urdang et al. | |
| 2004/0031045 A1 | 2/2004 | Ivanyi | |
| 2004/0250281 A1 | 12/2004 | Feininger et al. | |
| 2005/0054285 A1 | 3/2005 | Mears et al. | |
| 2005/0076358 A1 | 4/2005 | Yamada | |
| 2005/0138658 A1 | 6/2005 | Bryan | |
| 2005/0138659 A1 | 6/2005 | Boccon-Gibod et al. | |
| 2005/0193414 A1 | 9/2005 | Horvitz et al. | |
| 2005/0232411 A1 | 10/2005 | Srinivasan et al. | |
| 2006/0015902 A1 | 1/2006 | Matsuura et al. | |
| 2006/0085812 A1 | 4/2006 | Shishegar et al. | |
| 2006/0153296 A1 | 7/2006 | Deng | |
| 2006/0184961 A1 | 8/2006 | Lee et al. | |
| 2007/0006250 A1 | 1/2007 | Croy et al. | |
| 2010/0247065 A1 | 9/2010 | Cooper et al. | |

FOREIGN PATENT DOCUMENTS

| | | |
|---|---|---|
| WO | WO95/04430 | 2/1995 |
| WO | WO95/12278 | 5/1995 |
| WO | WO95/35606 | 12/1995 |
| WO | WO96/27840 | 9/1996 |
| WO | 0011865 | 3/2000 |
| WO | WO0058967 | 10/2000 |
| WO | WO0062298 | 10/2000 |
| WO | WO0122729 | 3/2001 |
| WO | WO01/61892 | 8/2001 |
| WO | WO0176248 | 10/2001 |
| WO | WO03/032639 | 4/2003 |
| WO | WO03/049339 | 6/2003 |
| WO | WO03/052552 | 6/2003 |
| WO | WO03/060630 | 7/2003 |
| WO | 2004/051997 A1 | 6/2004 |
| WO | WO2004051997 | 6/2004 |
| WO | WO2005/036877 | 4/2005 |
| WO | WO2005/079457 | 9/2005 |
| WO | WO2005/079941 | 9/2005 |
| WO | WO2005/084186 | 9/2005 |
| WO | WO2005/107110 | 11/2005 |
| WO | WO2005/114450 | 12/2005 |
| WO | WO2005/124583 | 12/2005 |
| WO | WO2005/125198 | 12/2005 |
| WO | WO2006/012629 | 2/2006 |
| WO | WO2006/014495 | 2/2006 |
| WO | WO2006/020560 | 2/2006 |
| WO | WO2006/055897 | 5/2006 |

OTHER PUBLICATIONS

International Preliminary Examining Authority, International Preliminary Examination Report for PCT/US2005/023995, Jul. 28, 2006, 15 pages.

Submitted herewith is a International Preliminary Examination Report for International Application No. PCT/US02/38012, dated Jun. 7, 2006, 7 sheets.

Submitted herewith is an International Search Report for International Application No. PCT/US02/38012, dated May 9, 2003, 2 sheets.

Friedhelm Schmidt, "The SCSI Bus and IDE Interface Protocols, applications and programming" Addison-Wesley 2nd Addition, Jun. 17, 1999, cover, pp. 38-40, 46-49, 62, 68-71 (13 pages).

I/ONE, IEEE 1394 Architecture, Dec. 15, 2003, 11 pages.

Chinese Patent Office, Translation of Office Action pertaining to Chinese Patent Application No. 200580026327.5 issued on Mar. 2, 2011 (3 pages).

Australian Government, IP Australia, "Examiner's first report on patent application No. 2005269957," issued on Feb. 5, 2010 (2 pages).

Canadian Intellectual Property Office, "Examination Report," Canadian patent application No. 2,507,317, Feb. 12, 2010 (3 pages).

Supplementary European Search Report corresponding to Application No. 02784621.1, dated Jul. 28, 2009 (4 pages).

"Snoop Mechanism to Moniter Computer Bus," IBM Technical Disclosure Bulletin, IBM Corp., New York, vol. 32, No. 11. Apr. 1, 1990 (2 pages).

United States Patent and Trademark, "Office Action" issued in connection with U.S. Appl. No. 11/138,576, mailed Oct. 19, 2010 (13 pages).

United States Patent and Trademark, "Office Action" issued in connection with U.S. Appl. No. 11/138,576, mailed Apr. 27, 2010 (9 pages).

Chinese Patent Office, "Text of the Second Office Action", issued in connection with Chinese Patent Application No. 200580026327.5, Jan. 31, 2012, (3 pages).

Chinese Patent Office, "Third Office Action", issued in connection with Chinese Patent Application No. 200580026327.5, May 16, 2012, (4 pages).

European Patent Office, "Extended European Search Report", issued in connection with PCT application No. 05764664.8, Dec. 27, 2011, (7 pages).

Australian Government, "Examiner's Report No. 2", issued in connection with Australian patent application No. 2005269957, Jul. 14, 2011, (9 pages).

Australian Government, "Notice of Acceptance", issued in connection with Australian patent application No. 2005269957, Sep. 8, 2011, (4 pages).

* cited by examiner

METHODS AND APPARATUS FOR IDENTIFYING VIEWING INFORMATION ASSOCIATED WITH A DIGITAL MEDIA DEVICE

RELATED APPLICATIONS

This patent is a continuation of International Application Serial Number PCT/US2005/023995, entitled "Methods and Apparatus for Identifying Viewing Information Associated with a Digital Media Device" filed on Jul. 1, 2005. This patent also claims priority from U.S. Provisional Application Ser. No. 60/584,996, entitled "Methods and Apparatus for Identifying Viewing Information Associated with a Digital Media Device" filed on Jul. 2, 2004. International Application Serial Number PCT/US2005/023995 and U.S. Provisional Application Ser. No. 60/584,996 are hereby incorporated by reference in their entireties.

TECHNICAL FIELD

The present disclosure relates generally to media monitoring or media measurements and, more particularly, to methods and apparatus for identifying viewing information associated with a digital media device.

BACKGROUND

Television ratings information is typically generated by collecting viewing records or other viewing information from a group of statistically selected households. Each of the statistically selected households typically has a data logging and processing unit commonly referred to as a "home unit." The home unit is often in communication with a variety of attachments that provide inputs to the home unit or receive outputs from the home unit. The home unit usually processes the inputs (e.g., channel tuning information, viewer identification information, etc.) from the attachments to produce viewing records. Viewing records may be generated on a periodic basis (i.e., at fixed time intervals) or may be generated in response to a change in an input such as, for example, a change in the identities of the persons viewing the television, a change in the channel tuning information (i.e., a channel change), etc. In any case, each viewing record typically contains channel information such as a station or channel number and a time (e.g., a date and time of day) at which the channel was viewed. Of course, viewing records may contain other information such as the identities of viewers present at the viewing time.

Often, the home unit collects a quantity of viewing records and transmits collected viewing records, usually daily, to a central data processing facility for further processing or analysis. The central data processing facility receives viewing records from home units located in some or all of the statistically selected households and analyzes the viewing records to ascertain the viewing behaviors of a particular household or a particular group of households selected from all participating households. Additionally, the central data processing facility may generate viewing behavior statistics and other parameters indicative of viewing behavior associated with some or all of the participating households.

To generate viewing behavior information from viewing records, the central data processing facility compares reference data such as a list of programs (i.e., a schedule of television programming or lineup) to the viewing records. In this manner, the central data processing facility can determine which program was viewed by matching the time and channel information in a viewing record to the program associated with that same time and channel in the program schedule or lineup. Such a matching process can be carried out for each of the viewing records received by the central data processing facility, thereby enabling the central data processing facility to reconstruct what programs were watched or consumed by all participating households and the times at which the programs were consumed.

While known methods and apparatus for ascertaining the viewing behavior of a large population are well suited for viewing records associated with live viewing of television programming, these techniques are not suitable for use with audio and/or video programs that are recorded and viewed later. In particular, for pre-recorded program information, the viewing time is delayed with respect to the time at which the program information was available as a live program. As a result, viewing records containing viewing time information cannot be compared to reference program guide information at the central data processing facility to determine what programs are associated with the viewing records. Further, the tuning information available from, for example, a frequency detector attachment in communication with a television that is being used to display a previously recorded program does not provide useful tuning information. More specifically, the recorded program is typically supplied by a video recording device (e.g., a VCR) or the like that sends unmodulated low-level audio and video signals to the audio and video inputs of the television that bypass the tuner circuitry of the television.

The use of digital video recording devices (DVR's), personal video recording devices (PVR's) such as the TiVo® system further complicates collection of viewing behavior information because viewers in households with these types of recording devices can rapidly change between live viewing of a program, time-delayed viewing of the program, fast forwarding and rewinding the program, pausing the program, and/or recording the program for later viewing. The use of processing techniques based on recognition of program signatures has been employed in some cases where it is difficult to obtain accurate timing information and in cases where it may otherwise be difficult to obtain viewing time information and channel information associated with the currently viewed program content. However, these processing techniques are not well suited for use in situations where a recording device may enable rapid changes between live viewing of a program, delayed viewing of the program, viewing of another program while recording the program, etc.

Further, digital television (DTV) systems are expected to supplant traditional analog television systems in the near future because DTV systems offer interactivity to viewers, and provide compatibility with computers and/or the Internet and better image resolution and audio quality than traditional analog television systems. In particular, DTV systems broadcast programs by modulating one or more streams of digital packets on a single carrier frequency (e.g., a major channel). Because multiple streams of data packets can be multiplexed on a single carrier frequency, multiple programs can be carried by that single frequency (e.g., one or more minor channels). Although the technology used to broadcast and receive television signals is changing, the need to monitor the size and demographic composition of the viewing audience is not changing. To identify viewing information, for example, existing methods and apparatus identify the major channel by identifying the frequency tuned by the tuner of a DTV and/or a set top box (STB). However, unless the major channel carries only one minor channel, the identification of the major channel does not identify which of the minor channels are being tuned (e.g., which of the multiple programs are consumed by viewers). Faced with changing technology, audience measurement companies are developing new ways to efficiently and accurately gather the desired viewing information from DTV's and/or STB's.

DETAILED DESCRIPTION

In general, methods and apparatus for identifying viewing information via a digital media device are disclosed herein. The example methods and apparatus disclosed herein may be used to collect viewing information by monitoring digital information or data conveyed via a data bus associated with the digital media device, extracting event information associated with the digital media device from the monitored data, and identifying viewing information based on the event information. The viewing information may be further processed to ascertain various audience behaviors such as, for example, statistical viewing patterns that may be used to develop ratings information for audio programs, video programs, and/or other types of consumed media such as web pages, still images, etc. The example methods and apparatus may be applied to a variety of digital media devices such as, for example, devices configured to tune, render, record, playback and/or otherwise process digital media information.

Figure 1:
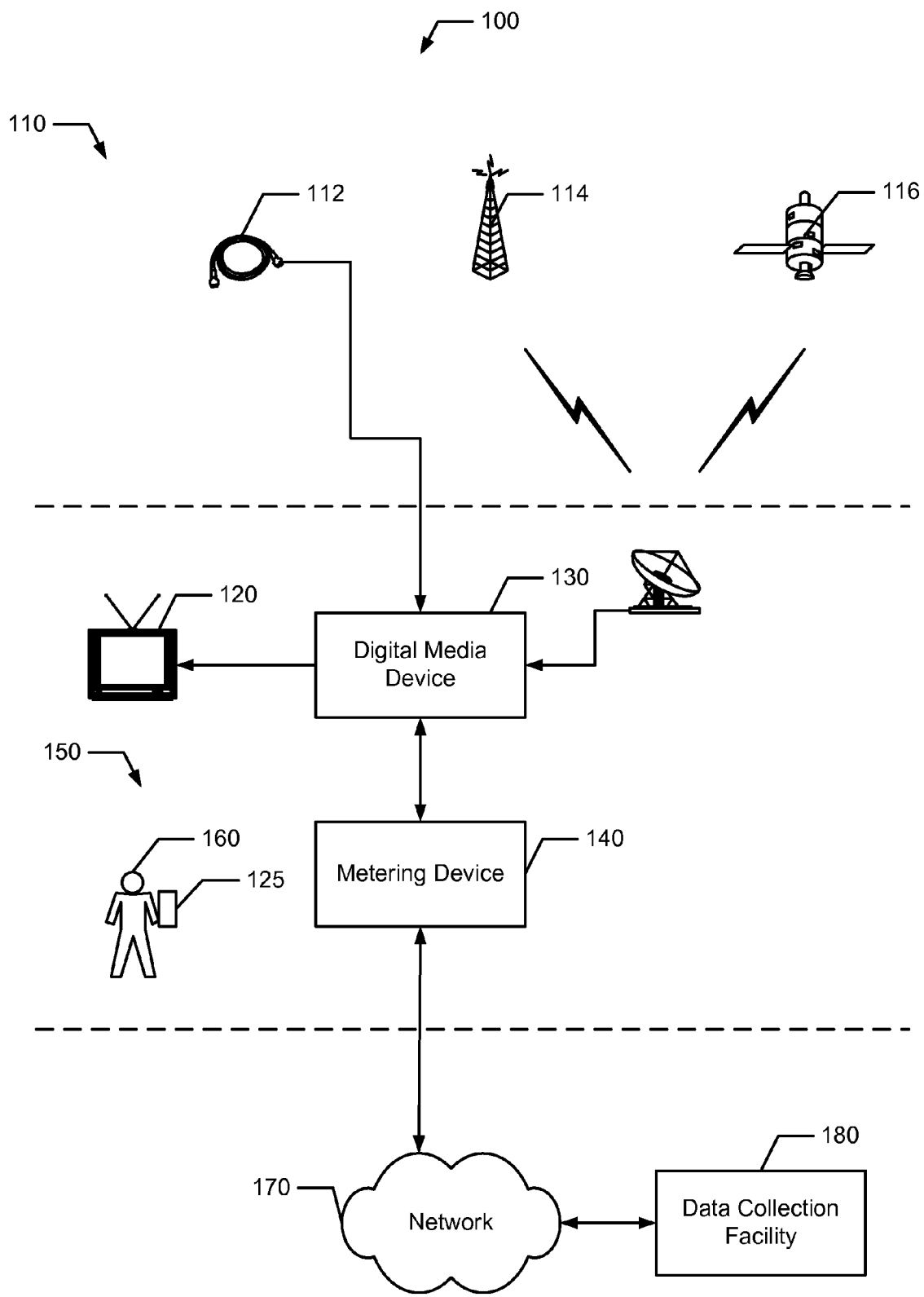
FIG. 1 is a block diagram representation of an example media monitoring system.

Referring to FIG. 1, an example media monitoring system 100 including a media service provider 110, a television 120, a remote control device 125, and a digital media device 130 such as, for example, a set top box (STB), a personal video recording device (PVR), and/or a multimedia personal computer (PC) is metered using an audience measurement system. The components of the media monitoring system 100 may be coupled in any well-known manner. In the illustrated example, the television 120 is positioned in a viewing area 150 located within a household occupied by one or more people, referred to as household members 160, some or all of whom have agreed to participate in an audience measurement research study. The viewing area 150 includes the area in which the television 120 is located and from which the television 120 may be viewed by the one or more household members 160 located in the viewing area 150. In the illustrated example, a metering device 140 is configured to collect viewing information based on event information associated with the digital media device 130. The metering device 140 provides this viewing information as well as other tuning and/or demographic data via a network 170 to a data collection facility 180. The network 170 may be implemented using any desired combination of hardwired and wireless communication links, including for example, the Internet, an Ethernet connection, a digital subscriber line (DSL), a telephone line, a cellular telephone system, a coaxial cable, etc. The data collection facility 180 may be configured to process and/or store data received from the metering device 140 to produce ratings information.

The media service provider 110 may include a cable network 112, one or more radio towers or transmitters 114, and one or more satellites 116. For example, in the case where the media service provider 110 is a cable television provider, the media service provider 110 may distribute television program signals primarily or exclusively via the cable network 112. In the case where the media service provider 110 is a satellite broadcast service, the media service provider 110 may deliver media signals to consumers directly via the one or more satellites 116 without using the cable network 112 or the radio towers 114.

The media service provider 110 may transmit media signals in any suitable format such as a National Television Standards Committee (NTSC) television signal format, a high definition television (HDTV) signal format, an Advanced Television Systems Committee (ATSC) television signal format, a phase alternation line (PAL) television signal format, a digital video broadcasting (DVB) television signal format, an Association of Radio Industries and Businesses (ARIB) television signal format, etc.

The user-operated remote control device 125 allows a user (e.g., the household member 160) to cause the television 120 to tune to signals transmitted on a desired channel, and to cause the television 120 to process and present the programming content contained in the signals transmitted on the desired channel. The processing performed by the television 120 may include, for example, extracting a video and/or an audio component delivered via the received signal, causing the video component to be displayed on a screen/display associated with the television 120, and causing the audio component to be emitted by speakers associated with the television 120. The programming content contained in the television signal may include, for example, a television program, a movie, an advertisement, a video game, a web page, and/or a preview of other programming content that is currently offered or will be offered in the future by the service provider 110. The remote control device 125 may also be used to control the digital media device 130. For example, the remote control device 125 may be used to navigate through setup menus and/or to enable/disable an operating mode of the digital media device 130 such as, for example, a tune mode, a record mode, a playback mode, a fast forward mode, a rewind mode, a slow play mode, a stop mode, etc. Alternatively, a different user-operated remote control device may be used to control operations of the digital media device 130.

While the components shown in FIG. 1 are depicted as separate structures within the media monitoring system 100, the functions performed by some of these structures may be integrated within a single unit or may be implemented using two or more separate components. For example, although the television 120 and the digital media device 130 are depicted as separate structures, the television 120 and the digital media device 130 may be integrated into a single unit (e.g., an integrated digital TV set). In another example, the television 120, the digital media device 130, and/or the metering device 140 may also be integrated into a single unit.

To assess the viewing behaviors of individual household members 160 and/or groups of households, a viewing information collection system (e.g., the viewing information collection system 200 of FIG. 2) may collect viewing information associated with the digital media device 130. Based on selection by the household members 160, the digital media device 130 may tune to, receive, record and/or playback media signals transmitted on a desired channel, and/or cause the television 120 to process and present the programming content contained in the signals transmitted on the desired channel. The metering device 140 may identify viewing information based on events associated with the digital media device 130 such as, for example, a tuning event, a recording event, and/or a playback event. The viewing information collection system 200 may provide this viewing information as well as other tuning and/or demographic data to the data collection facility 180 via the network 170 for processing to ascertain audience viewing behaviors or habits.

Figure 2:
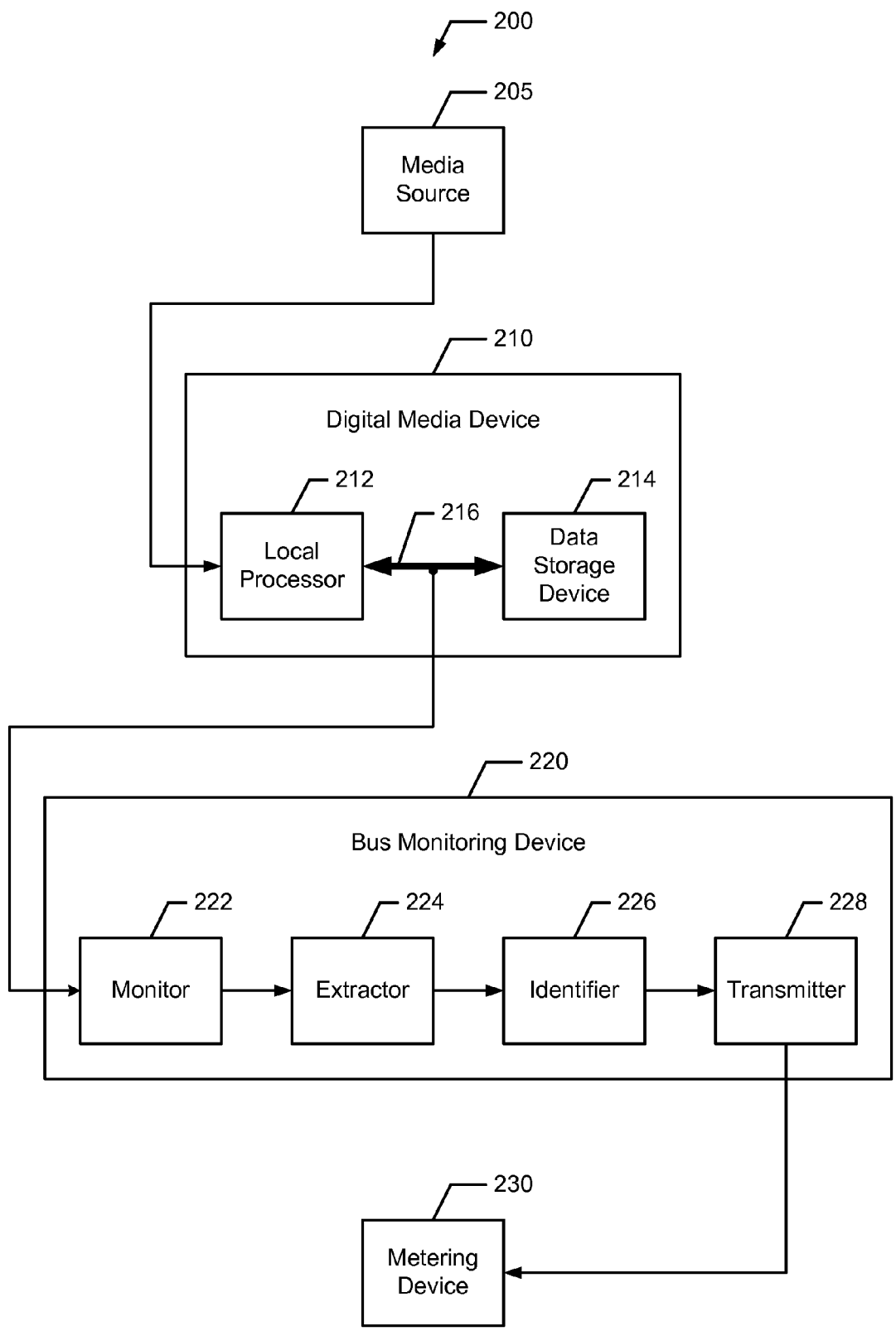
FIG. 2 is a block diagram representation of an example viewing information collection system.

In FIG. 2, an example viewing information collection system 200 includes a media source 205, a digital media device 210, a bus monitoring device 220, and a metering device 230. The digital media device 210 includes a local processor 212 and a data storage device 214 that are communicatively coupled via a data bus 216. The digital media device 210 may be, for example, a digital video recording device (DVR) or a personal video recording device (PVR), both of which are well-known devices. In particular, a PVR is a DVR that has been configured to be automatically adaptive to or otherwise automatically responsive to the viewing preferences of a particular user or groups of users within a particular household. For example, many DVRs provide a network connection (e.g., a phone line connection) that enables the DVR to communicate with a central service facility. In particular, the central service facility may receive viewer preference information from the DVR and send configuration information to the DVR based on the viewer preference information. The configuration information is used by the DVR to automatically configure the DVR to record video programs consistent with the preferences of the viewer or viewers associated with that DVR. TiVo® is one well-known service that is purchased by DVR owners to provide PVR functionality to their DVR's. Alternatively, the digital media device 210 may be any other type of digital recording device that internally records or otherwise conveys any desired type of digital audio information, digital video information, and/or digital image information via a data bus (e.g., the data bus 216). For example, the digital media device 210 may be a multimedia personal computer configured to process (e.g., record, store, playback, etc.) any type of digital information including, for example, web pages, pushed data, audio data, and/or video data. In another example, the digital media device 210 may be an STB including memory or a data storage device on which any type of digital information such as that described above may be stored via the data bus 216.

The local processor 212 shown within the digital media device 210 includes the hardware and software necessary to process analog and/or digital signals containing audio, video, still image, and/or text information received from one or more sources. In the example of FIG. 2, the digital media device 210 receives media signals from the media source 205, which may be, for example, a cable television line, a television tuner, a camcorder, a VCR, the Internet, etc.

In operation, the local processor 212 processes received media signals and stores information associated with the processed signals as digital information on the data storage device 214 via the data bus 216. The information stored on the data storage device 214 via the data bus 216 may include, for example, audio and/or video content, source and/or content identification information, time and/or date information, viewer information, event information associated with an operating mode, condition or state of the digital media device 210, etc. In addition, the digital media device 210 may send the processed signals as analog and/or digital information to one or more devices such as, for example, a television for live viewing, and/or retrieve and output for viewing digital information previously stored on the data storage device 214. Further, the local processor 212 may store other information on the data storage device 214 via the data bus 216 such as, for example, a user log including event information as described in connection with FIGS. 4, 5, and 6.

The data storage device 214 may be, for example, a hard drive or disk drive that uses a magnetic storage medium having, for example, eighty gigabytes or more of storage capacity. Alternatively, any other type of data storage device(s) may be used. For example, a hard drive or disk drive that uses an optical storage medium may be used, a magnetic tape drive may be used, or one or more solid state memory devices (e.g., integrated circuit memory such as flash memory, static random access memory, dynamic random access memory, magneto-resistive random access memory, etc.) may be used instead of, or in addition to, a disk drive. More generally, the data storage device 214 may include any type or combination of memory devices that enables storage of digital information and enables the digital information to be written to and read (i.e., retrieved) from the data storage device 214.

In one example, the data bus 216 is based on an integrated drive electronics (IDE) standard or protocol, which is a well-known parallel data bus configuration and protocol used with disk drive-based storage devices. Alternatively, the data bus 216 may be based on any other parallel or serial communication interface that enables digital information to be stored on and retrieved from the data storage device 214.

The bus monitoring device 220 includes a monitor 222, an extractor 224, an identifier 226, and a transmitter 228. The monitor 222 is in communication with the data bus 216 to monitor digital information transmitted or conveyed between the local processor 212 and the data storage device 214 via the data bus 216. In general, the monitor 222 reads (i.e., snoops) the data conveyed via the data bus 216 to identify digital information or digital information packets associated with events of the digital media device 210 such as, for example, recording a program and/or playback of a program by the digital media device 210, an operating mode event associated with the digital media device 210, etc. For example, the monitor 222 may identify data packets having a characteristic such as a predefined size, encrypted data, unencrypted data, etc. In one manner, a content provider may provide a decryption key and/or an access code to the bus monitoring device 220 to decrypt encrypted data and extract event information from the encrypted data. The extractor 224 is configured to extract event information from the data conveyed via the data bus 216 so that the identifier 226 may identify viewing information such as channel information, program information, operating mode information, and/or recording information based on the event information. The transmitter 228 is configured to transmit the viewing information to the metering device 230 (e.g., the metering device 140 of FIG. 1) and/or the data collection facility 180 (FIG. 1) via the network 170.

While the components shown in FIG. 2 are depicted as separate blocks within the viewing information collection system 200, the functions performed by some of these blocks may be integrated within a single semiconductor circuit or may be implemented using two or more separate integrated circuits. For example, although the bus monitoring device 220 and the metering device 230 are depicted as separate blocks, the bus monitoring device 220 may be integrated with the metering device 230.

Figure 3:
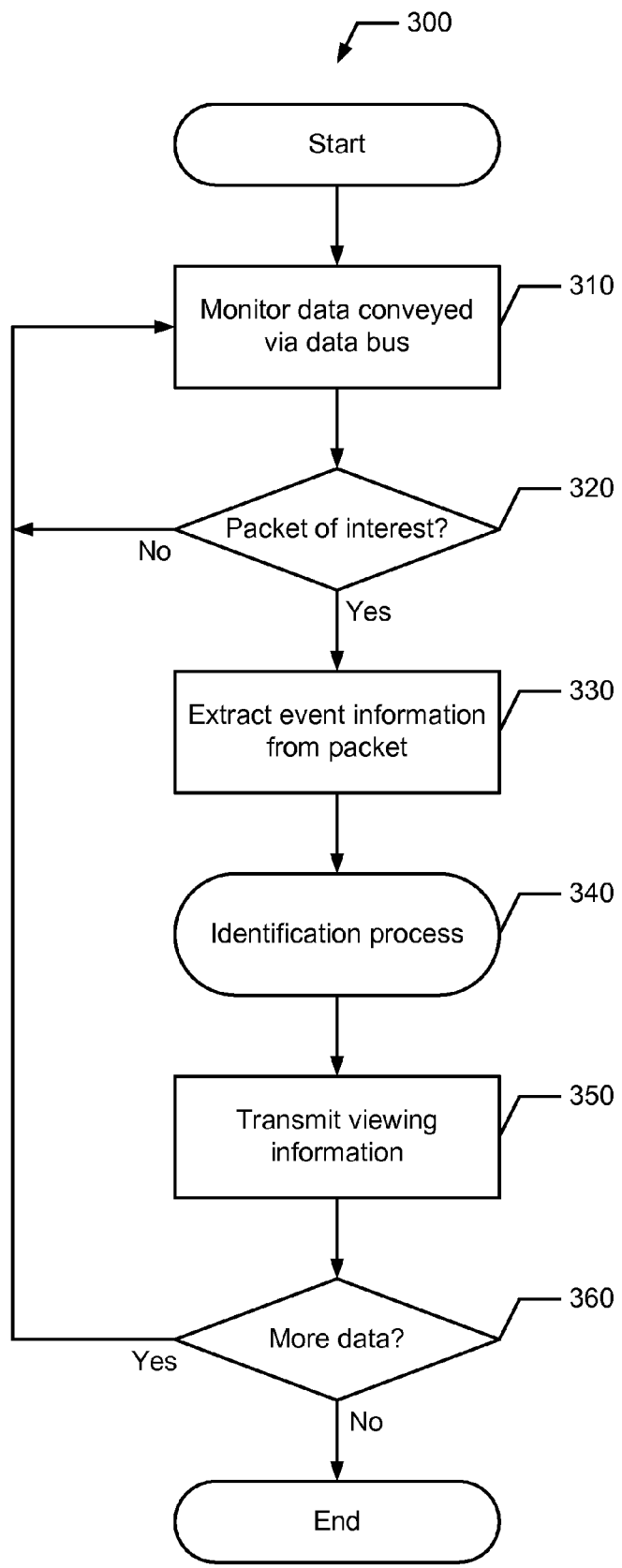
FIG. 3 is a flow diagram depicting one manner in which the example viewing information collection system of FIG. 2 may be configured to collect viewing information associated with a digital media device.

FIG. 3 depicts one manner in which the example viewing information collection system 200 of FIG. 2 may be configured to collect viewing information associated with a digital media device (e.g., the digital media device 210). The example process 300 of FIG. 3 may be implemented as machine accessible instructions utilizing any of many different programming codes stored on any combination of machine-accessible media such as a volatile or nonvolatile memory or other data storage device (e.g., a floppy disk, a CD, and/or a DVD). For example, the machine accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium. Further, although a particular order of operations is illustrated in FIG. 3, these operations can be performed in other temporal sequences. Again, the example process 300 is merely provided and described in conjunction with the components of FIG. 2 as an example of one way to configure a system to collect viewing information associated with a digital media device.

In the example of FIG. 3, the process 300 begins with the monitor 222 monitoring data conveyed between the local processor 212 and the data storage device 214 via the data bus 216 of the digital media device 210 (block 310). In general, the monitor 222 reads the data conveyed via the data bus 216 to identify digital information packets of interest (e.g., a data packet having a characteristic such as data associated with events of the digital media device 210) (block 320). In particular, in one example, the monitor 222 determines if a large data packet is to be stored (e.g., written to, recorded on, etc.) on the data storage device 214. Typically, digital audio, video, and/or image information are transmitted in relatively large data packets. If the digital media device 210 is a DVR, for example, video information of a program is typically sent to the data storage device 214 in 65,536-byte packets, whereas user configuration information and other configuration information are usually sent in much smaller packets such as, for example, 512-byte packets. As described in detail below, selectively extracting event information from only large data packets (e.g., all or most of which contain digital audio, video, and/or image information) minimizes the amount of memory and processing overhead needed to manage the event information. However, limiting extracting event information from only large data packets is optional and, if desired, event information from all data packets may be extracted. The monitor 222 may be configured to determine other desired types of data packets or data packets having other characteristics conveyed via the data bus 216. For example, the monitor 222 may be configured to determine if a data packet including unencrypted data associated with, for example, American Standard Code for Information Interchange (ASCII) characters, a Moving Picture Experts Group (MPEG) file, etc. is to be stored on the data storage device 214.

Figure 4:
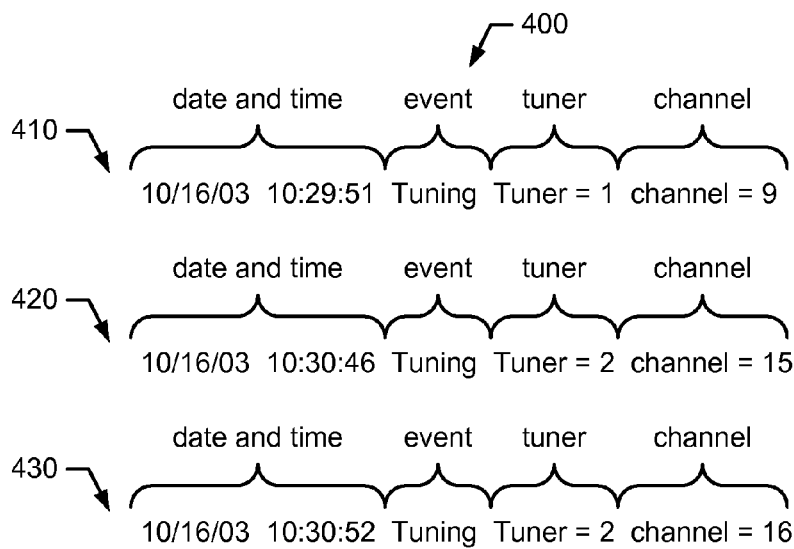
FIG. 4 depicts an example sequence of events record associated with the example viewing information collection system of FIG. 2.
Figure 5:
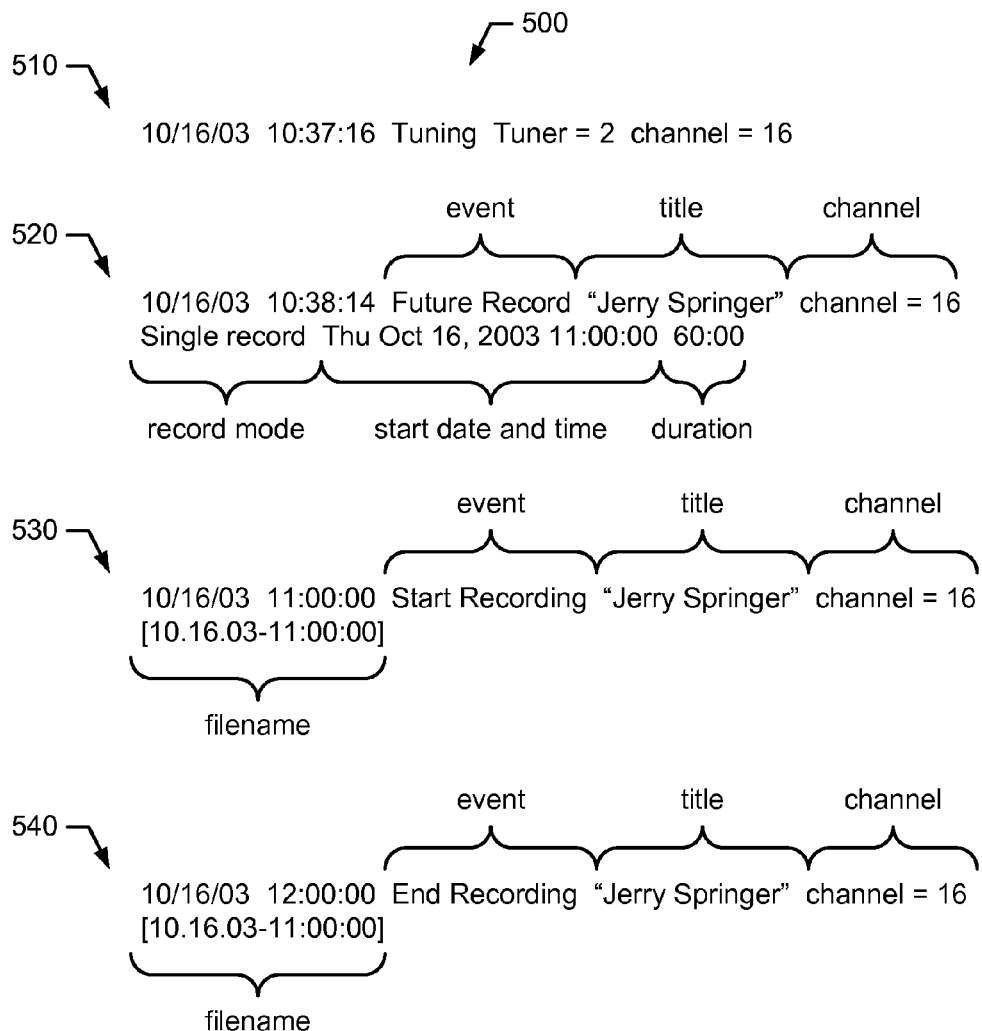
FIG. 5 depicts another example sequence of events record associated with the example viewing information collection system of FIG. 2.
Figure 6:
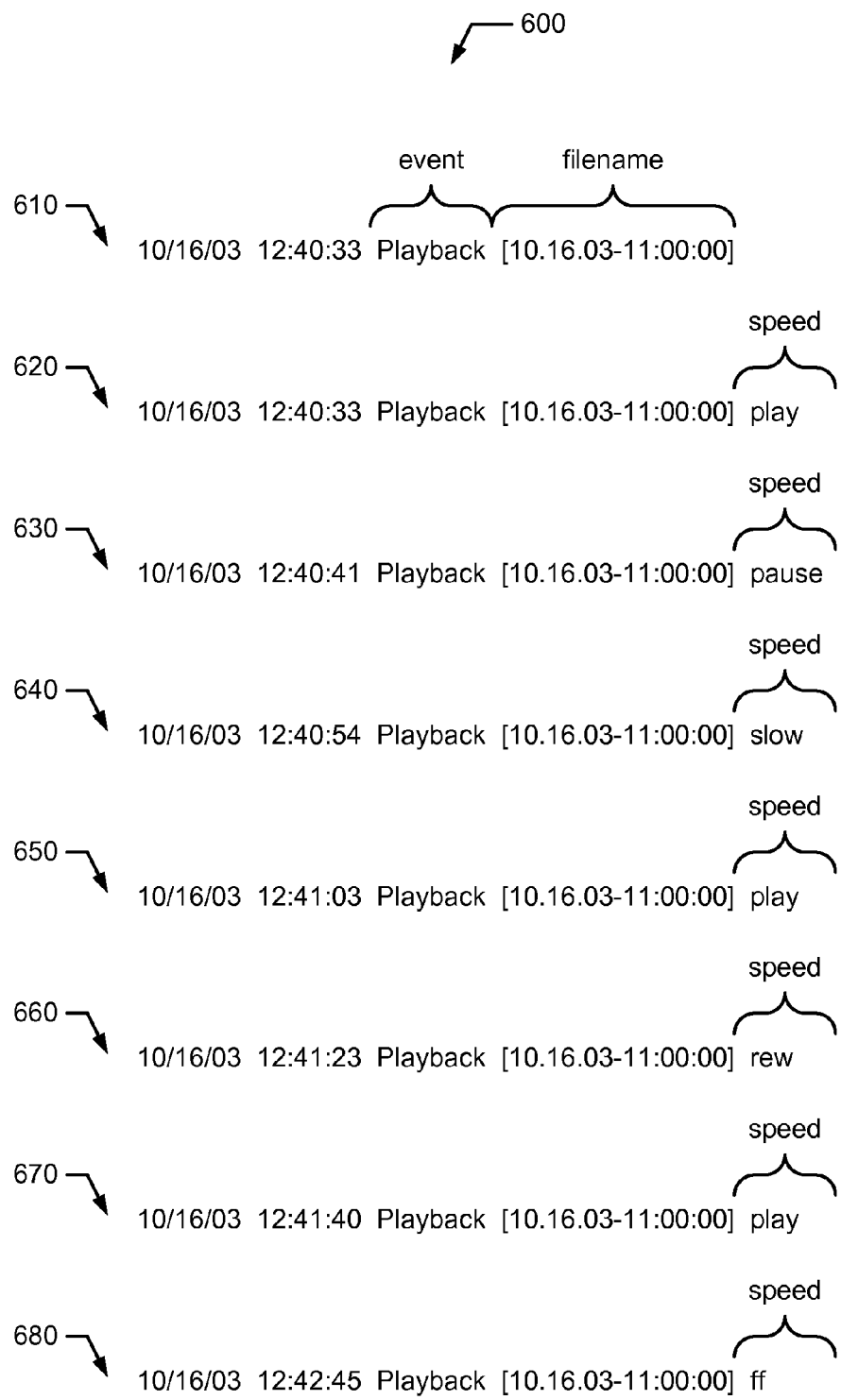
FIG. 6 depicts yet another example sequence of events record associated with the example viewing information collection system of FIG. 2.

If the monitor 222 does not detect a packet of interest (block 320), the monitor 222 returns to block 310 to continue monitoring the data conveyed via the data bus 216. On the other hand, if the monitor 222 detects a packet of interest at block 320 (e.g., a relatively large data packet), the extractor 224 extracts event information from the packet (block 330). The event information may indicate a manner in which the digital media device 210 is used. For example, the digital media device 210 may be used to tune to a channel, record a program, playback a program, etc. In particular, the event information may include one or more sequence of events records as described in detail below. Referring to FIG. 4, for example, the extractor 224 may extract a sequence of events record 400 associated with the digital media device 210 containing channel information, generally shown as 410, 420, and 430. In another example in FIG. 5, the extractor 224 may extract a sequence of events record 500 associated with the digital media device 210 containing program information and recording information, generally shown as 510, 520, 530, and 540. Further, in yet another example shown in FIG. 6, the extractor 224 may extract a sequence of events record 600 associated with the digital media device 210 containing time-shift mode information (e.g., time-delayed viewing of a program), generally shown as 610, 620, 630, 640, 650, 660, 670, and 680 and described in detail below. While the sequence of events records 400, 500, and 600 are depicted using a single format as shown in FIGS. 4, 5, and 6 for simplicity, such records may be formatted in other manners but still include channel information, program information, recording information, time-shift mode information, etc.

Figure 7:
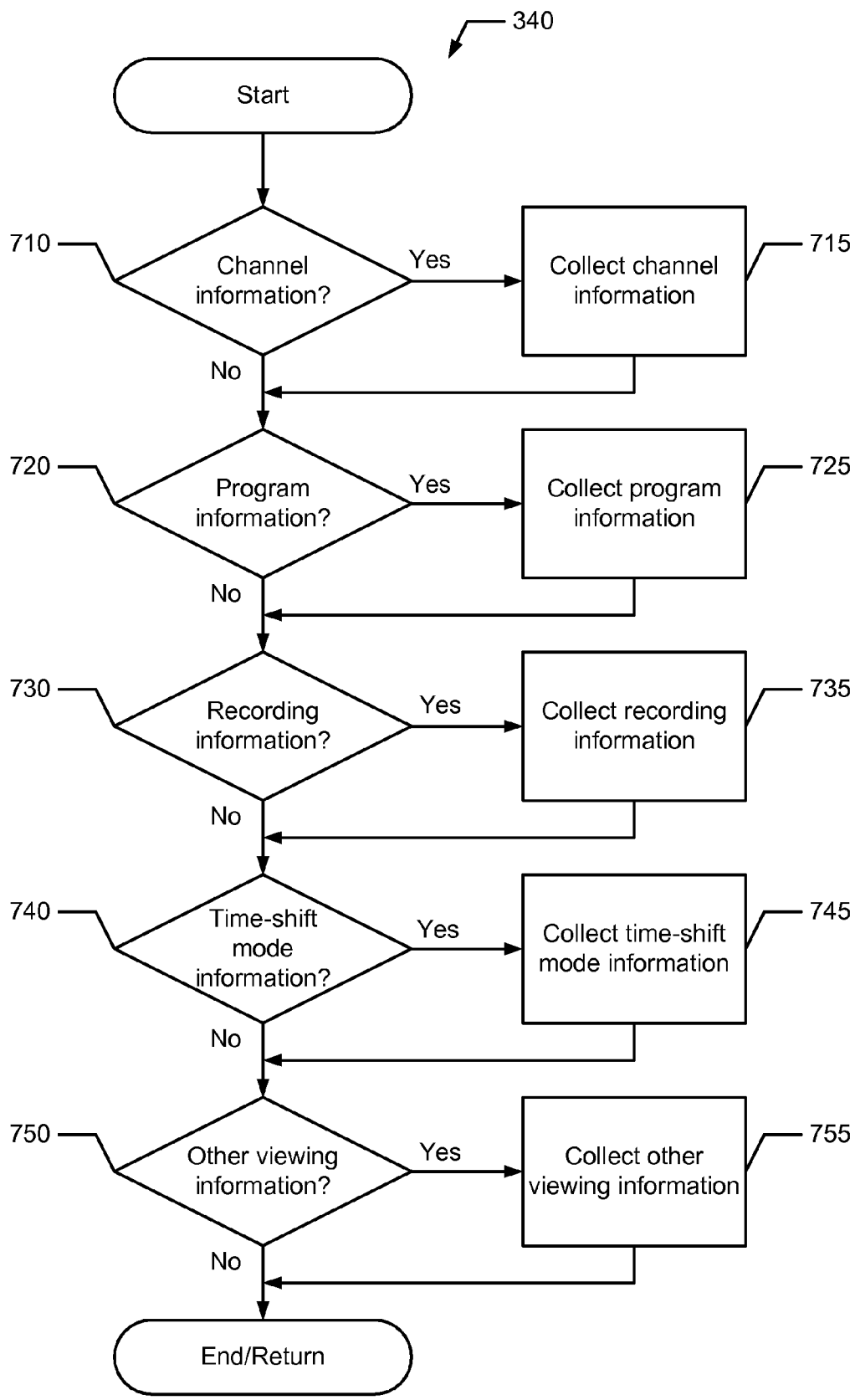
FIG. 7 is a flow diagram depicting one manner in which the identification process of FIG. 3 may be implemented.

Based on the event information extracted by the extractor 224, the bus monitoring device 220 may identify viewing information associated with the digital media device 210 using an identification process 340. As illustrated in FIG. 7, the identification process 340 begins by using the identifier 226 (FIG. 2) to identify channel information such as, for example, a channel tuned to by the digital media device 210 and a tuning source associated with the channel (e.g., which of a number of tuners is tuning to the channel) (block 710). If the identifier 226 detects that an event record contains channel information, the identifier 226 collects the channel information (block 715). In particular, an event record may indicate a channel tuned to by the digital media device 210, a tuning source associated with the tuned channel, and/or date and time of the event record. As illustrated in FIG. 4, for example, the event record 410 indicates that the digital media device 210 tuned to channel 9 (e.g., "channel=9") using a first tuner (e.g., "Tuner=1") on Oct. 16, 2003 at 10:29:51 am. Other event records may indicate that the digital media device 210 switched to a different tuner. For example, the event record 420 indicates that the digital media device 210 tuned to channel 15 (e.g., "channel=15") using a second tuner (e.g., "Tuner=2") on Oct. 16, 2003 at 10:30:46 am. The digital media device 210 may also switch to a different channel. For example, the event record 430 indicates that the digital media device 210 tuned to channel 16 (e.g., "channel=16") using the second tuner (e.g., "Tuner=2") on Oct. 16, 2003, at 10:30:52 am. The identifier 226 may also use the information associated with the tuner to determine whether the digital media device 210 is operating in, for example, a picture-in-picture mode (e.g., a smaller display within a larger display area) and/or a split-screen mode (e.g., two or more display areas tiled horizontally or vertically). In this manner, the digital media device 210 may provide media content to one display area (e.g., the smaller display area, the left display area, etc.) via the first tuner and provide media content to another display area (e.g., the larger display area, the right area, etc.) via the second tuner. Accordingly, the identifier 226 collects the channel information and then determines if the sequence of events record also includes program information as described in detail below (block 720).

Referring back to block 710, if the sequence of events record does not include channel information, the identifier 226 proceeds directly to block 720 to determine if the sequence of events record contains program information. If the identifier 226 detects that the sequence of events record includes program information, the identifier 226 collects the program information (block 725). In particular, an event record may indicate a title, date and time, and/or duration associated with a program. As illustrated in FIG. 5, for example, the event record 520 indicates that the program "Jerry Springer" is scheduled for Thursday, Oct. 20, 2003 at 10:00:00 am for 60 minutes. Accordingly, the identifier 226 collects the program information and then determines if the sequence of events record also contains recording information as described in detail below (block 730).

Referring back to block 720, if the sequence of events record does not contain program information, the identifier 226 proceeds directly to block 730 to determine if the sequence of events record includes recording information. If the identifier 226 detects that the sequence of events record includes recording information, the identifier 226 collects the recording information (block 735). In particular, an event record may indicate a recording mode and/or a filename associated with a program. Referring again to FIG. 5, for example, the event record 520 may indicate that the program "Jerry Springer" will be recorded (e.g., "Future Record") on a one-time basis (e.g., "Single Record"). Alternatively, a program may be recorded on a repeated basis, which may be indicated by "Repeated Record." As noted above, the sequence of events record may also contain a filename associated with the recorded program. For example, the event record 530 indicates the filename associated with the recorded program "Jerry Springer" (e.g., "10.16.03-11:00:00"). Alternatively, the filename may be formatted in accordance with the Unix Time Code (UTC) standard, which represents the filename as a number of seconds relative to Jan. 1, 1970. In any event, the identifier 226 collects the recording information and then determines if the sequence of events record contains time-shift mode information as described in detail below (block 740).

Referring back to block 730, if the sequence of events record does not contain program information, the identifier 226 proceeds directly to block 740 to determine if the sequence of events record includes time-shift mode information. If the sequence of events record does not contain time-shift mode information, the identifier 226 proceeds directly to block 750. Otherwise, if the identifier 226 detects that the sequence of events record includes time-shift mode information, the identifier 226 collects the time-shift mode information (block 745). In particular, an event record may indicate a time-shift speed associated with the digital media device 210. The time-shift speed may correspond to a play mode, a pause mode, a fast forward mode, a rewind mode, and/or a slow play mode of the digital media device 210. As illustrated in FIG. 6, for example, the event record 610 indicates that the digital media device 210 is operating in the time-shift mode (e.g., playback of a portion or the entire media content that was previously recorded by the digital media device 210). According to the event record 620, the digital media device 210 played a time-shifted version of a program at a normal playback speed (e.g., "play"). Following the event record 620, the event record 630 indicates that the digital media device 210 was operating in a pause mode (e.g., "pause"), which stops the digital media device 210 from playing the program. According to the event record 640, the digital media device 210 operated in a slow play mode (e.g., slow"), which plays the program at a speed slower than the normal playback speed. According to the event record 650, the digital media device 210 returned to the play mode at the normal playback speed. As indicated by the event record 660, the digital media device 210 operated in a rewind mode (e.g., "rew"), which plays the program in reverse. The digital media device 210 then returned to the play mode at the normal playback speed as indicated by the event record 670. According to the event record 680, the digital media device 210 operated in a fast forward mode (e.g., "ff"), which plays the program at a speed faster than the normal playback speed.

Alternatively, the time-shift mode of digital media device 210 may be based on a range of numbers representing the speed of the playback. For example, a zero in an event record may indicate that the digital media device 210 was in a pause mode. A positive integer such as a positive one may indicate that the digital media device 210 was operating in a normal playback mode, and a negative integer (e.g., a negative one) may indicate that the digital media device 210 was operating in a rewind mode. For example, a speed of negative two may indicate that the digital media device 210 was operating in a rewind mode. A positive integer greater than one may indicate that the digital media device 210 was operating in a fast forward mode. For example, a speed of two may indicate that the digital media device 210 was operating at a speed two times greater than the normal playback speed. A positive fractioned number may indicate that the digital media device 210 was operating in the slow play mode. For example, a speed of one-half may indicate that the digital media device 210 was operating at half the speed of the normal playback speed.

After identifying the time-shift mode information (block 740), the identifier 226 determines if the sequence of events record contains other viewing information such as interactive information (block 750). For example, the sequence of events record may include a selection of a video-on-demand by a viewer. In another example, the sequence of events record may include a response by the viewer to a survey. If the identifier 226 determines that the sequence of events record does not contain other viewing information, the identification process 340 terminates and returns control to block 350 of FIG. 3 as described in detail below. Otherwise, if the identifier 226 determines that the sequence of events record contains other viewing information, the identifier 226 collects the other viewing information (block 755), terminates the identification process 340, and returns control to block 350 of FIG. 3.

Referring back to FIG. 3, the transmitter 228 may transmit the viewing information identified by the identification process 340 to the metering device 230 (which may be a home unit and/or a central data processing facility such as the facility 180 of FIG. 1) for processing and/or further analysis to ascertain audience viewing behaviors or habits (block 350). The monitor 222 may determine whether to monitor the data bus 216 for additional data (block 360). If the monitor 222 detects additional data conveyed via the data bus 216, control returns to block 310. Otherwise, if the monitor 222 does not detect additional data conveyed via the data bus 216, the process 300 may terminate.

Figure 8:
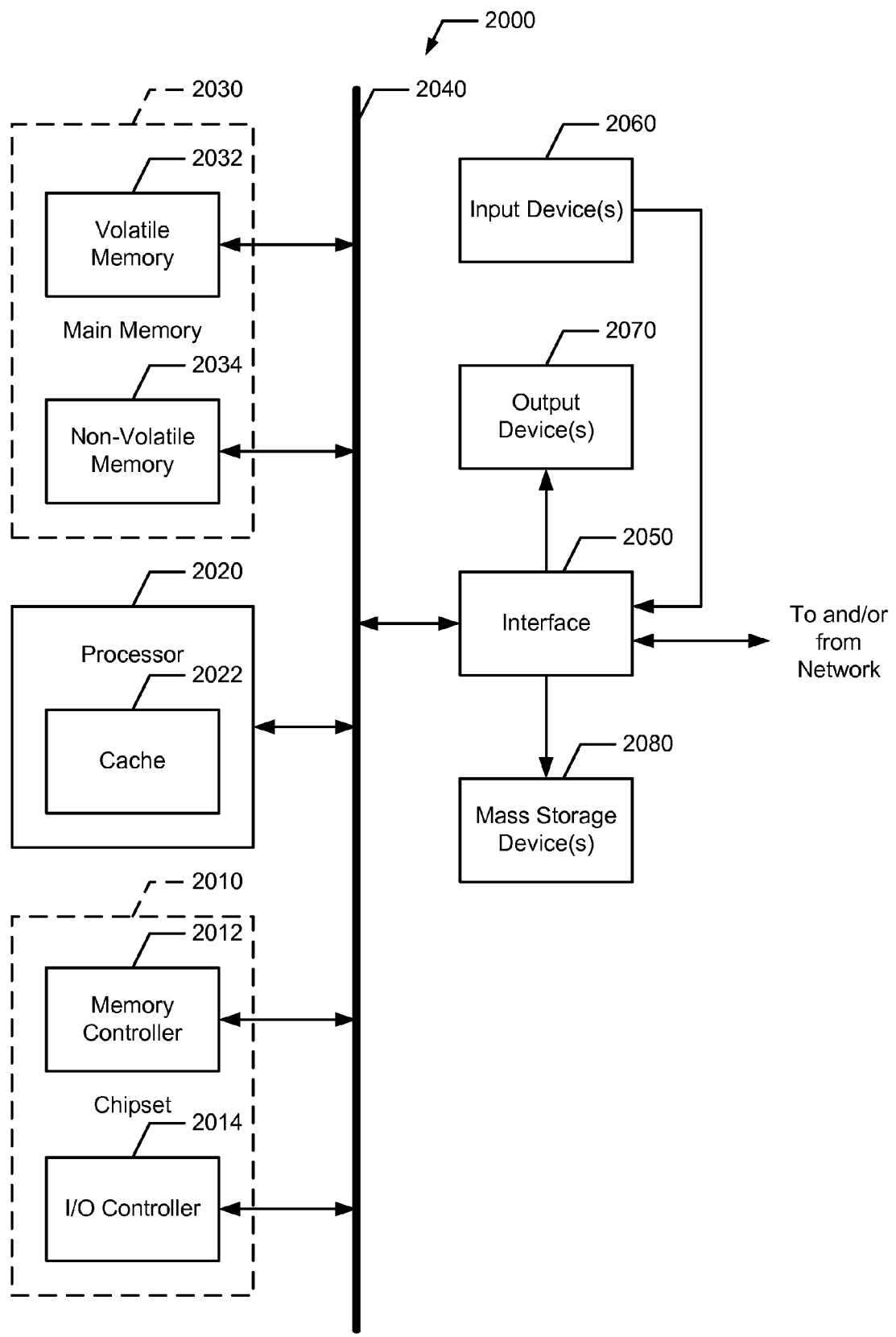
FIG. 8 is a block diagram representation of an example processor system that may be used to implement the example bus monitoring device of FIG. 2.

FIG. 8 is a block diagram of an example processor system 2000 that may used to implement the methods and apparatus disclosed herein. The processor system 2000 may be a desktop computer, a laptop computer, a notebook computer, a personal digital assistant (PDA), a server, an Internet appliance or any other type of computing device.

The processor system 2000 illustrated in FIG. 8 includes a chipset 2010, which includes a memory controller 2012 and an input/output (I/O) controller 2014. As is well known, a chipset typically provides memory and I/O management functions, as well as a plurality of general purpose and/or special purpose registers, timers, etc. that are accessible or used by a processor 2020. The processor 2020 is implemented using one or more processors. In the alternative, other processing technology may be used to implement the processor 2020. The processor 2020 includes a cache 2022 to store data.

As is conventional, the memory controller 2012 performs functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 also includes an interface circuit 2050 that is coupled to the bus 2040. The interface circuit 2050 may be implemented using any type of well-known interface standard such as an Ethernet interface, a universal serial bus (USB), a third generation input/output interface (3GIO) interface, and/or any other suitable type of interface.

One or more input devices 2060 are connected to the interface circuit 2050. The input device(s) 2060 permit a user to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 are also connected to the interface circuit 2050. For example, the output device(s) 2070 may be implemented by media presentation devices (e.g., a light emitting display (LED), a liquid crystal display (LCD), a cathode ray tube (CRT) display, a printer and/or speakers). The interface circuit 2050, thus, typically includes, among other things, a graphics driver card.

The processor system 2000 also includes one or more mass storage devices 2080 to store software and data. Examples of such mass storage device(s) 2080 include floppy disks and drives, hard disk drives, compact disks and drives, and digital versatile disks (DVD) and drives.

The interface circuit 2050 also includes a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network is typically controlled by the I/O controller 2014 in a conventional manner. In particular, the I/O controller 2014 performs functions that enable the processor 2020 to communicate with the input device(s) 2060, the output device(s) 2070, the mass storage device(s) 2080 and/or the network via the bus 2040 and the interface circuit 2050.

While the components shown in FIG. 8 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

While this disclosure is made with respect to example television systems, it should be understood that the disclosed system is readily applicable to many other media systems. Accordingly, while this disclosure describes example systems and processes, the disclosed examples are not the only way to implement such systems.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents. For example, although this disclosure describes example systems including, among other components, software executed on hardware, it should be noted that such systems are merely illustrative and should not be considered as limiting. In particular, it is contemplated that any or all of the disclosed hardware and software components could be embodied exclusively in dedicated hardware, exclusively in firmware, exclusively in software or in some combination of hardware, firmware, and/or software.

What is claimed is:

1. A method for identifying viewing information associated with a digital media device comprising:
    monitoring for sizes of data packets conveyed via a data bus within the digital media device that communicatively couples a processor within the digital media device and a data storage device within the digital media device;
    identifying a first data packet carrying at least one of audio content or video content and having at least a predefined size;
    decrypting at least a portion of the identified first data packet using at least one of a decryption key or an access code from a content provider;
    extracting event information associated with the digital media device from at least the decrypted portion, wherein the event information comprises an event record that includes at least an event; and
    identifying the viewing information based on the event information, wherein identifying the viewing information based on the event information comprises identifying the event from the event record and identifying at least one of a channel tuned to by the digital media device or a tuning source associated with the channel.

2. A method as defined in claim 1, further comprising monitoring whether data packets conveyed via the data bus include encrypted data.

3. A method as defined in claim 1, wherein extracting the event information associated with the digital media device from the first data packet comprises extracting a sequence of events record from the first data packet.

4. A method as defined in claim 1, wherein identifying the viewing information based on the event information further comprises identifying at least one of program information, operating mode information, or recording information.

5. A method as defined in claim 4, wherein the program information comprises at least one of a title, a filename, or a duration associated with a program.

6. A method as defined in claim 4, wherein the operating mode information comprises a time-shift speed associated with the digital media device corresponding to at least one of a play mode, a stop mode, a pause mode, a fast forward mode, a rewind mode, or a slow play mode.

7. A method as defined in claim 4, wherein the recording information comprises at least one of a single recording mode or a repeated recording mode associated with a program.

8. A method as defined in claim 1, wherein the data bus operates in accordance with an integrated drive electronics standard.

9. A method as defined in claim 1, wherein the data storage device comprises at least one of a magnetic storage medium, a solid state storage medium, or an optical storage medium.

10. A method as defined in claim 1, wherein the digital media device comprises at least one of a set top box or a digital video recording device.

11. A method as defined in claim 1 further comprising transmitting the viewing information to a data collection facility.

12. An apparatus for identifying viewing information associated with a digital media device comprising:
a monitor communicatively coupled to a data bus within the digital media device and configured to monitor sizes of data packets carrying at least one of audio data or video data conveyed between a processor within the digital media device and a data storage device within the digital media device via the data bus;
an extractor coupled to the monitor, the extractor to decrypt at least a portion of a first data packet, having at least a predefined size and including at least one of audio content or video content, using at least one of a decryption key or an access code from a content provider, and to extract event information associated with the digital media device from at least the first data packet, wherein the event information comprises an event record that includes at least an event; and
an identifier coupled to the extractor and configured to identify the event from the event record and identify the viewing information based on the event information.

13. An apparatus as defined in claim 12, wherein the monitor is configured to monitor for whether data packets conveyed via the data bus include encrypted data.

14. An apparatus as defined in claim 12, wherein the viewing information comprises at least one of channel information, program information, operating mode information, or recording information.

15. An apparatus as defined in claim 14, wherein the channel information comprises at least one of a channel tuned to by the digital media device or a tuning source associated with the channel.

16. An apparatus as defined in claim 14, wherein the program information comprises at least one of a title, a filename, or a duration associated with a program.

17. An apparatus as defined in claim 14, wherein the operating mode information comprises a time-shift speed associated with the digital media device corresponding to at least one of a play mode, a stop mode, a pause mode, a fast forward mode, a rewind mode, or a slow play mode.

18. An apparatus as defined in claim 14, wherein the recording information comprises at least one of a single recording event or a repeated recording event.

19. An apparatus as defined in claim 12, wherein the data storage device comprises at least one of a magnetic storage medium, a solid state storage medium, or an optical storage medium.

20. An apparatus as defined in claim 12, wherein the digital media device comprises at least one of a set top box or a digital video recording device.

21. An apparatus as defined in claim 12 further comprising a communication interface configured to transmit the viewing information to a data collection facility.

22. A non-transitory machine accessible medium having instructions stored thereon, which when executed, cause a machine to at least:
monitor sizes of data packets conveyed via a data bus within a digital media device that communicatively couples a processor within the digital media device to a data storage device within the digital media device;
identify a first data packet carrying at least one of audio content or video content and having at least a predefined size;
decrypt at least a portion of the identified first data packet using at least one of a decryption key or an access code from a content provider;
extract event information associated with the digital media device from at least the decrypted portion, wherein the event information comprises an event record that includes at least an event; and
identify viewing information associated with the digital media device based on the event information by identifying the event from the event record and identifying at least one of a channel tuned to by the digital media device or a tuning source associated with the channel.

23. A method as defined in claim 4, wherein the operating mode information comprises a picture-in-picture mode or a split-screen mode and the program information comprises first program information from a first tuner and second program information from a second tuner.

24. A method as defined in claim 1, further comprising discarding a second data packet having less than the predefined size.

25. A method as defined in claim 24, wherein discarding the second data packet comprises not extracting event information from the second data packet when the second data packet has less than the predefined size.

26. An apparatus as defined in claim 12, wherein the extractor is to discard, without extracting event information, data packets having less than the predefined size.

27. A machine accessible medium as defined in claim 22, wherein the instructions cause the machine to at least discard, without extracting event information, data packets having less than the predefined size.

28. An apparatus as defined in claim 12, wherein at least the extractor is implemented using a processing device external to the digital media device.

* * * * *